Feb. 9, 1965   D. R. PEARL   3,168,902
CONSTANT VOLUME FLOW CONTROL VALVE
Filed Sept. 5, 1961
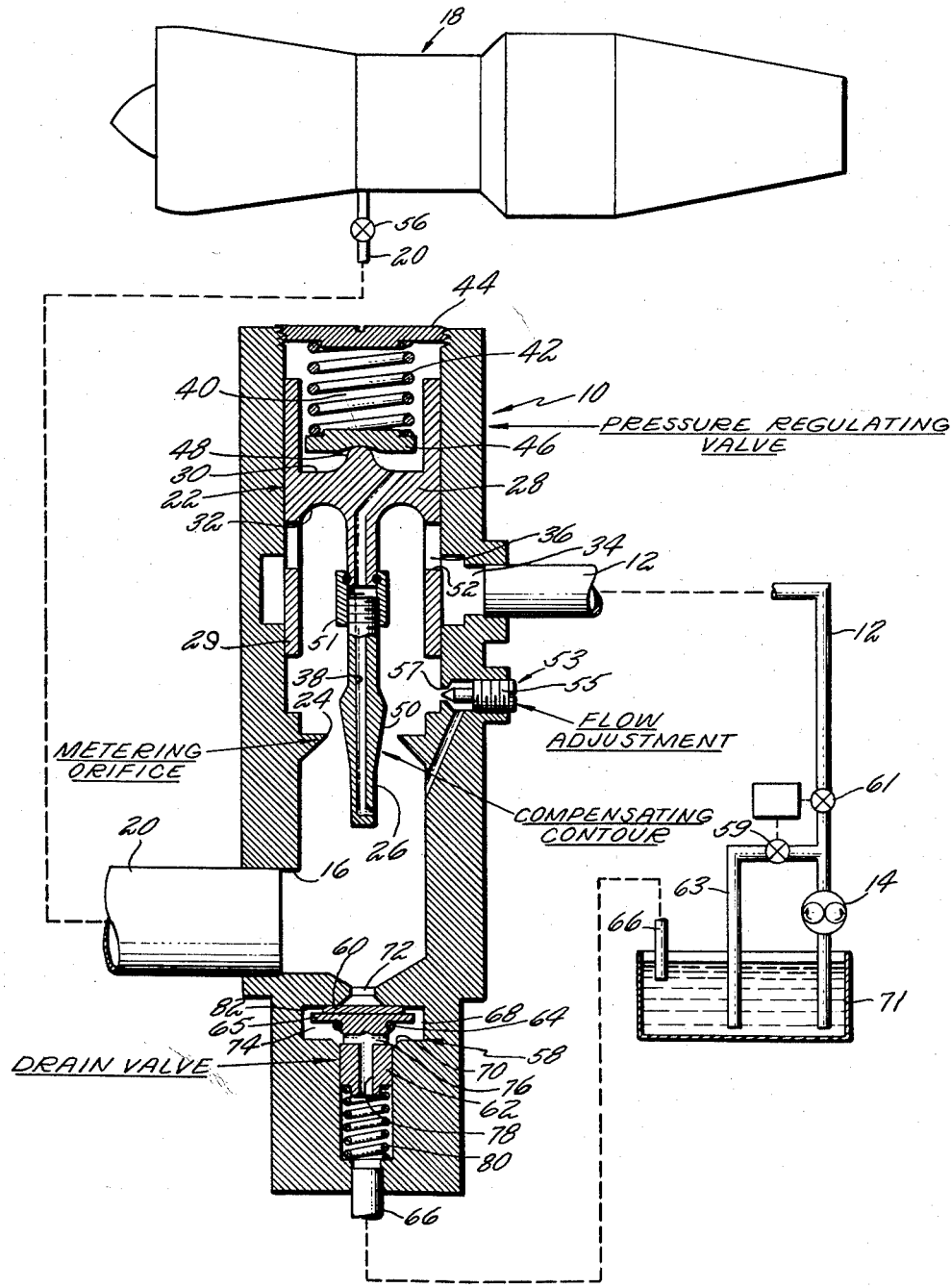
INVENTOR
DAVID R. PEARL
BY *Norman Friedland*
AGENT

United States Patent Office 3,168,902
Patented Feb. 9, 1965

3,168,902
CONSTANT VOLUME FLOW CONTROL VALVE
David R. Pearl, West Hartford, Conn., assignor to United Aircraft Corporation, East Hartford, Conn., a corporation of Delaware
Filed Sept. 5, 1961, Ser. No. 136,045
11 Claims. (Cl. 137—501)

This invention relates to constant flow valves and more particularly to means for compensating for errors by trimming the valve as a function of the hydraulic flow forces.

An object of this invention is to provide a constant fluid-flow valve which automatically maintains constant volume of fluid flow through an orifice.

It is a further object to provide a constant volume valve which includes means for automatically draining fluid from the valve when inoperative.

These and other features of this invention will become more apparent from the following description of the single drawing.

In the interest of providing a simple, yet accurate device for regulating water to an internal combustion engine, I have devised means for automatically compensating for errors which heretofore existed in constant flow valves as will become apparent from the description to follow. The valve consists of a fixed orifice and a pressure regulating valve which serves to maintain the pressure drop across the orifice at a constant value. It is well known in the art that attendant these valves there are inherent errors which arise due to variations in the inlet pressure, spring rate, and density changes. To compensate for these errors, I have provided a contoured plug which moves with the pressure regulating valve to vary the area of the orifice as a function of these errors. It will become apparent that when the pressure drop across the regulating valve metering edge increases, the strength of the influx momentum vector increases. This momentum acts on the under surface of the valve and in effect subtracts from the spring force which tends to reduce the orifice pressure drop setting. The pressure drop setting is obtained by selecting the proper spring in the pressure regulating valve. Thus, it follows that the plug which is indexed to the setting of the pressure regulating valve can be designed to have the proper contour for compensating or trimming out the effect of these errors. As shown in its preferred embodiment, the constant flow valve generally indicated by numeral 10 is connected to the supply line 12, for receiving pressurized fluid from the pump 14. The metered fluid is discharged through port 16 and in turn directed to the internal combustion engine 18 through passage 20.

Constant flow valve 10 comprises a pressure regulating valve generally indicated by numeral 22, a fixed orifice 24 and contour plug 26. The pressure regulating valve serves to maintain the pressure drop across orifice 24 at a constant value. This valve comprises a piston member 28 which has formed on its opposite ends reaction surfaces 30 and 32. These reaction surfaces sense the pressure of the fluid upstream and downstream of fixed restriction 24. Piston 28 carries an elongated cylinder 29 which overlaps annulus 34 and extends therebeyond. Port 36 formed in cylinder 29 cooperates with annnlus 34 wherein metering edge 52 regulates the flow of fluid to fixed restriction 24. As noted in the drawing the fluid egressing from port 36 acts on the underside of reaction surface 32 of piston 28. A central drilled passage 38 is formed in plug member 26 and communicates fluid downstream of the fixed restriction to chamber 40 formed on the upside of the piston 28. This fluid acts on reaction surface 30 to oppose the force imparted on the reaction surface 32. The spring 42 imparts an additional force to piston 28. This force constitutes the value of the pressure drop across the fixed restriction 24 and the pressure regulating valve through the metering orifice formed by metering edge 52 serves to maintain this pressure drop at a constant value. Spring 42 may have one end acting on a suitable adjustable screw 44 which may be adjusted for trimming the value of the pressure drop. The other end of the spring is held by spring retainer 46 which bears against the upstanding number 48.

To compensate or trim for these errors mentioned in the above, a contoured plug extends from the piston through the opening in the metering orifice 24. Thus the plug moves synchronously with the piston. The curvature of contour portion 50 of plug 26 is preascertained by establishing the range of pressure and temperature to which the valve will be subjected.

In selecting the proper curvature of the contoured portion of plug 26 a nominal plug shape is first predetermined by the theoretical considerations previously described. The next step would be to instrument and operate the valve over the required range and conditions thereby determining the position of contoured plug 26, the orifice pressure drop and the flow errors at each operating point. It is then a simple matter to modify the curvature of contour 50 of the plug so that the flow errors are substantially eliminated for the whole range of operating conditions. For example with relatively high spring rates, the value of the pressure drop may be relatively high and hence, the area change of the orifice will be greater per unit movement of the piston than would be if the spring rate was relatively low. Once the conditions to which the valve will be subjected are established, the valve plug would therefore have its contour section 50 indexed in accordance with the position of metering edge 52 relative to the annulus 34.

The plug 26 may be formed in two corresponding sections held in alignment by collar 51. The collar is threaded to the lower portion of the plug while the upper portion is in rotational relationship with the collar 51 and held from moving longitudinally by any suitable means. Thus, it is apparent that the contour portion 50 may be adjusted with respect to the orifice so that the contour will compensate for the errors when a new flow rate passing through orifice 24 has been selected.

A flow adjustment 53 having a screw member 55 cooperating with orifice 57 serves to "zero-in" the exact flow passing through orifice 24.

As mentioned above the preferred embodiment for which this particular invention is practiced is for metering water to an internal combustion engine. As it is extremely important in this embodiment to assure that the water does not freeze within the valve and further to prevent corrosion, an automatic draining valve is provided as generally indicated by numeral 58. When the flow control valve is inoperative, the valve 56 disposed in line 20 and located between the flow control valve and engine 18, is turned to an off position and simultaneously the pump is disconnected from the valve in any suitable manner. As shown, a pair of ganged valves 59 and 61 may be actuated for causing valve 61 to close and valve 59 to open for bypassing the flow control valve and directing fluid discharging from pump 14 back to the reservoir through line 63. The drain valve 58 comprises valve element 65 having reduced diameter portion 62. A fluted member 60 is formed on the top surface of valve element 65 to allow the flow egressing from drain passage 72 to dump into chamber 74. The annular groove 76 is formed in the reduced diameter portion 62 and communicates with passage 78 for conducting flow from passage 72 directly to the reservoir 71. A spring 80 acting on the underside of the valve element 65 urges the flute against the upper inner surface of the housing 82.

When the flow valve is in the operative condition, the fluid downstream of orifice 24 passes through the drain passage 72 and owing to the fact that the annular groove is of a small diameter and affords a restriction to the fluid, pressure builds up in chamber 74. This pressure acting on the large diameter portion of valve element 65 forces the element downward against the action of spring 80. This motion is obtained by virtue of the fact that the effective area on the top surface of valve element 65 is larger than the effective area on the underneath surface located within chamber 74 of the valve element. A seal 64 surrounding the valve element is seated against seat 70 formed on the inner diameter of the housing 82. When in the retracted position, the valve element seats and prevents the fluid from passing to drain.

Now that the details of the present invention have been described, the operation thereof will be illustrated herein and below. As for example, when such a device is utilized to regulate the water injection into a turbine type of power plant the valve may have a requirement of metering water at the rate of 20,000 to 25,000 lbs. per hour and the accuracy must be held to plus or minus 200 lbs. per hour i.e. $\mp.8\%$.

The metering edge 52 regulates pressurized fluid flowing from passage 12 and annulus 24 in accordance with the pressure acting on reaction surfaces 30 and 32. This fluid passes through orifice 24 in such a manner that the pressure drop there-across is at a constant value. Obviously, since the area of orifice 24 is fixed and the preselected pressure drop is constant, flow through will be constant except for the aforementioned errors. To compensate for these aforementioned errors, the contoured surface 50 moves with respect to orifice 24 for varying its effective area. For example: If the speed of pump 14 which may be driven by engine 18 speeds up and increases the pressure in line 12, the increased pressure sensed on reaction surface 32 will cause piston 28 to lift upwardly the effective area of port 36 which simultaneously causes the valve plug 26 to lift. Also by virtue of piston 28 lifting, the height of spring 42 is changed. Because of the inherent errors in the spring, the value of the preselected pressure drop will change slightly. The repositioning of contoured plug 26 changes the area of orifice 24 and hence compensates for the spring error so that although the pressure drop value has been changed, the flow will still be substantially constant. It will be realized that in a similar manner as the temperature of the fluid changes so as to vary the pressure thereof, the pressure or volume of the fluid changes such that the momentum forces acting on reaction surface 32 will be altered and hence unbalancing the force on piston 28 as described above the contoured plug moves in a direction to compensate for these errors.

What has been shown by this invention is a simple flow control valve which meters flow at a constant volume and is characterized as being extremely accurate, highly reliable, easily and economical to manufacture. Means are provided to assure that complete and automatic draining of the valve will occur when the valve is in the inoperative condition.

It is to be understood that the invention is not limited to the specific embodiment herein illustrated and described, but may be used in other ways without departing from its spirit as defined by the following claims.

I claim:

1. A valve adapted to control the flow of fluid at a constant value comprising a housing having an inlet and outlet, a fixed metering orifice disposed between the inlet and outlet, adjusting means including a movable member adapted to move in the valve for restricting fluid flow for maintaining the pressure drop across the orifice at a constant value, a contoured plug extending through said orifice and connected to said movable member and moveable in response to said adjusting means.

2. In a fluid flow control, a source of fluid under pressure, valve means for regulating the flow of fluid to a receiver including a fixed restriction orifice, moveable means upstream of said orifice for varying the flow of fluid to maintain a constant pressure drop across said orifice, and a needle-type valve having a contoured portion extending in said orifice for varying the orifice area, said needle-type valve being connected to and moveable by said moveable means.

3. A valve adapted to maintain a constant volume of flow comprising a housing having an inlet and outlet, a fixed metering orifice disposed between the inlet and outlet, movable means varying the opening area of the inlet for maintaining the pressure drop across said orifice at a constant value, variable area means responsive to said movable means for varying the area of said metering orifice for maintaining a substantially constant flow of fluid through said outlet.

4. In a fluid flow control, a source of fluid under pressure, valve means for regulating the flow of fluid including a fixed restriction orifice, moveable means upstream of said orifice for varying the flow of fluid to said orifice to maintain a constant pressure drop thereacross, said moveable means defining a chamber for receiving fluid downstream of said orifice, a spring disposed in said chamber and acting on one side of said moveable means, a reaction surface formed on the other side of said moveable means subjected to the fluid pressure upstream of said orifice, an elongated stem fixed to and extending from said moveable means and projecting through said orifice, said stem having a contoured portion cooperating with said orifice for varying the area of said orifice.

5. In a control as defined in claim 4 including a passage bypassing said metering orifice and an adjustable valve means for regulating the flow of fluid in said passage.

6. In a control as defined in claim 4 including an adjustable member acting on one end of said spring.

7. In a control as defined in claim 4 including adjusting means for mechanically positioning the contoured portion with respect to said orifice.

8. In a control as defined in claim 4 wherein said orifice is of the sharp-edge type.

9. In a constant fluid control valve comprising a ported housing having an elongated bore, an inlet port for receiving pressurized fluid, an elongated member longitudinally moveable in said bore and cooperating with said inlet port, a fixed metering orifice in said bore and spaced from said inlet port, said longitudinal member defining a pair of opposing chambers having a pair of opposing reaction surfaces disposed in each of said chambers, one of said reaction surfaces responsive to the fluid upstream of said orifice and the other of said responsive surfaces responsive to the fluid downstream of said orifice, a spring urging said member in one direction, said spring and said pressures acting on the reaction surfaces maintaining the pressure drop across the metering orifice at a constant value, an elongated member secured to and extending from said moveable member and projecting through the metering orifice, a contoured portion on said elongated member varying the area of said orifice.

10. In combination, a constant volume regulating valve comprising a housing having an elongated bore, a moveable member disposed in said bore and defining a chamber and opening in said bore for receiving high pressure fluid, said moveable member cooperating with said opening for regulating the flow into said bore, a fixed metering orifice located in said bore for regulating the flow of fluid to an outlet opening in said housing, a spring acting on one end of said moveable member for urging it in one direction, fluid conducting means for directing pressure downstream of said orifice to urge said moveable member in the same direction of said spring, a reaction surface formed on the opposite end of said member and responding to the inlet pressure for opposing said spring and downstream pressure forces, an elongated plug member secured to and extending from the moveable member and projecting through said orifice, said plug member contoured for varying the area of said orifice.

11. A flow control valve having an inlet and outlet communicating with a bore formed in the casing, a projection extending from the inner surface of said bore and projecting into said bore for defining a fixed metering orifice, means for maintaining the pressure drop across the orifice at a constant value, said means comprising a moveable wall defining a chamber, an elongated stem which is integral with said moveable wall extending into and beyond said orifice, a passage formed in said stem communicating with said chamber, said member having an annular member projecting into said bore and cooperating with the inlet for regulating the flow of fluid from the inlet to the metering orifice, a contoured portion formed on said stem projecting into said orifice for varying the area of the orifice as a function of the position of said moveable member, said contour member cooperating with said orifice for regulating a constant volume flow of fluid through said valve.

References Cited by the Examiner
UNITED STATES PATENTS

| | | | |
|---|---|---|---|
| 1,468,434 | 9/23 | Zander | 137—503 |
| 1,538,427 | 5/25 | Earl | 137—8 |
| 1,923,595 | 8/33 | Temple | 137—501 |
| 2,288,297 | 6/52 | Naiman | 137—8 |
| 2,951,501 | 9/60 | Thylefors | 137—501 |
| 2,968,315 | 1/61 | Fisher | 137—517 |
| 2,973,778 | 3/61 | Baker | 137—501 |
| 2,981,283 | 4/61 | Willetts et al. | 137—517 |
| 3,085,590 | 4/63 | McIlhenny | 137—501 |

M. CARY NELSON, *Primary Examiner.*

MARTIN P. SCHWADRON, *Examiner.*